United States Patent
Ochs et al.

(10) Patent No.: US 11,884,571 B2
(45) Date of Patent: Jan. 30, 2024

(54) ALTERNATIVE FLUORINATING AGENTS FOR THE PRODUCTION OF FLUORINATED QUARTZ GLASS

(71) Applicant: Heraeus Quarzglas GmbH & Co. KG, Hanau (DE)

(72) Inventors: Stefan Ochs, Hanau (DE); Martin Trommer, Hanau (DE); Thomas Kayser, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 175 days.

(21) Appl. No.: 17/395,777

(22) Filed: Aug. 6, 2021

(65) Prior Publication Data

US 2022/0041489 A1 Feb. 10, 2022

(30) Foreign Application Priority Data

Aug. 6, 2020 (EP) ..................................... 20189830

(51) Int. Cl.
*C03B 20/00* (2006.01)
*C03C 3/06* (2006.01)

(52) U.S. Cl.
CPC ................ *C03B 20/00* (2013.01); *C03C 3/06* (2013.01); *C03C 2201/12* (2013.01); *C03C 2203/40* (2013.01)

(58) Field of Classification Search
None
See application file for complete search history.

(56) References Cited

U.S. PATENT DOCUMENTS

| | | | |
|---|---|---|---|
| 4,586,943 A | 5/1986 | Kyoto et al. | |
| 4,645,524 A | 2/1987 | Bocko et al. | |
| 4,979,971 A | 12/1990 | Kyoto et al. | |
| 5,069,701 A | 12/1991 | Pastor et al. | |
| 5,071,460 A * | 12/1991 | Fujiura | ............... C03B 19/1415 65/413 |
| 2001/0018835 A1 | 9/2001 | Abe et al. | |
| 2003/0221459 A1 | 12/2003 | Walczak | |
| 2015/0037513 A1 | 2/2015 | Bi et al. | |

FOREIGN PATENT DOCUMENTS

| | | | |
|---|---|---|---|
| EP | 0 139 532 | 5/1985 | |
| EP | 0 161 680 | 11/1985 | |
| JP | S62-260728 | 11/1987 | |
| JP | S63-225543 | 9/1988 | |
| JP | 2012-246157 | 12/2012 | |
| WO | WO-8607348 A * | 12/1986 | ....... C03B 37/01807 |
| WO | 03/101900 | 12/2003 | |

OTHER PUBLICATIONS

Harold Simmons Booth and Reuben Alexander Osten, The Fluorination of Chlorodisiloxane. Silcon Oxyfluoride, Journal of the American Chemical Society., vol. 67, pp. 1092-1096. Jul. 1945.

* cited by examiner

*Primary Examiner* — Queenie S Dehghan
(74) *Attorney, Agent, or Firm* — Dicke, Billig & Czaja, PLLC

(57) ABSTRACT

A process for producing a fluorinated quartz glass is described, including providing an $SiO_2$ soot body; reacting the $SiO_2$ soot body with a fluorinating agent having a boiling point of greater than or equal to $-10°$ C. to obtain a fluorinated $SiO_2$ soot body; and vitrifying the fluorinated $SiO_2$ soot body.

5 Claims, No Drawings

ALTERNATIVE FLUORINATING AGENTS FOR THE PRODUCTION OF FLUORINATED QUARTZ GLASS

CROSS-REFERENCED TO RELATED APPLICATION

This Utility patent application claims priority to European Application No. 20189830.1 filed on Aug. 6, 2020, which is incorporated herein by reference.

TECHNICAL FIELD

One aspect relates to a process for the production of fluorinated quartz glass and to the fluorinated quartz glass obtainable by this process according to the invention. A further aspect is the use of alternative and improved fluorinating agents for the production of fluorinated quartz glass.

BACKGROUND

For the production of synthetic quartz glass, $SiO_2$ particles are generated from a silicon-containing starting substance in a CVD process by hydrolysis or oxidation and deposited on a moving carrier. A distinction can be made between external and internal deposition processes. In external deposition processes, the $SiO_2$ particles are deposited on the outside of a rotating carrier. Examples of such external deposition processes are the so-called OVD process (Outside Vapour Phase Deposition), the VAD process (Vapour Phase Axial Deposition), the POD process (Plasma Outside Deposition) or the PECVD process (Plasma Enhanced Chemical Vapour Deposition). The best-known examples of an internal deposition process are the MCVD process (Modified Chemical Vapor Deposition), the FCVD process (Furnace Chemical Vapor Deposition) and the PCVD process (Plasma Chemical Vapor Deposition), in which $SiO_2$ particles are deposited on the inner wall of a tube heated from the outside.

At sufficiently high temperatures in the area of the carrier surface, direct vitrification of the $SiO_2$ particles occurs, also known as "direct vitrification". In contrast, in the so-called "soot process", the temperature during deposition of the $SiO_2$ particles is so low that a porous $SiO_2$ soot layer is obtained, which is then sintered into transparent quartz glass in a separate process step. Both the direct vitrification process and the soot process result in a dense, transparent, high-purity and synthetic quartz glass.

The soot process is particularly suitable for the production of synthetic quartz glass containing foreign atoms (doping), since the porous structure of the soot body allows foreign atoms to be incorporated.

By introducing foreign atoms into the quartz glass, its physical properties can be influenced. For example, doping quartz glass with fluorine leads to a lowering of the refractive index. Fluorine-doped quartz glass is therefore used, among other things, for the production of light-conducting refractive index structures in optical fibers, for example, for special fibers for light power transmission that have one or more F-doped, refractive index-lowered cladding layers, for the production of active high-power laser fibers and their precursors with an F-doped outer cladding layer, for fluorine-doped tubes and capillaries that are used, among other things, for fiber combiners, for bend-insensitive fibers or in so-called "ultra low-loss fibers." A number of processes are available to the person skilled in the art. For example, as a semi-finished product for such optical fibers, either a preform can be used which has a refractive index profile in the radial direction and which can be drawn directly into the desired fiber. Alternatively, a rod- or tube-shaped cylinder having at least one layer of fluorine-doped quartz glass can be used. This cylinder can be elongated together with other cylindrical components as an ensemble in a coaxial arrangement to the fiber. Furthermore, such fluorine-doped quartz glass cylinders are used in laser and semiconductor manufacturing.

The production of fluorine-doped quartz glass is known from the prior art. US 2001/0018835 A, for example, relates to the production of UV-resistant, F-doped quartz glass, in which soot bodies are heated in an atmosphere of hydrogen or oxygen and, in a subsequent process step, sintering is carried out in a fluorine-containing atmosphere. This two-stage treatment is intended to improve the UV transmission of the resulting quartz glass.

JP 63-225543 A describes a fluorine doping and vitrification of a porous silica-containing preform with the objective of avoiding structural defects.

WO 03/101900 A discloses a process for producing a doped optical fiber preform in which the soot body is first treated in a chlorine-containing atmosphere and, in a subsequent step, exposed to a fluorine-containing gas.

EP 0 161 680 A describes a process of manufacturing a glass preform for an optical fiber, in which the glass preform is formed from fine glass particles containing $SiO_2$ and then sintered in an atmosphere of He and $SiF_4$.

EP 0 139 532 A describes a process for producing a glass preform for optical fibers by heating a soot-like glass preform in the presence of a fluorine-containing gas.

U.S. Pat. No. 4,645,524 describes a process for the preparation of a sodium doped glass by vapour deposition, whereby the process uses a sodium fluoroalkoxide vapour and a $SiCl_4$ vapour. Both vapours are simultaneously supplied into a reaction zone of a burner, where, with heating/oxidation of the vapour mixture, a sodium-doped $SiO_2$ soot body is then formed. Thus, the preparation of the $SiO_2$ body and its doping takes place simultaneously. Moreover, even though the sodium compounds used in this process may have a fluorine atom in their structures, the resulting glass is free of any fluorine. This can be derived from the table 1 of U.S. Pat. No. 4,645,5234 in which the compositions of the prepared glass materials are described (up to 100 wt.-%) and whereby in none of the specific prepared glass a fluorine content is disclosed. That said, U.S. Pat. No. 4,645,524 does not disclose how to fluorinate a quartz glass.

US 2015/037513 A describes a method for forming an optical coating on a substrate having a first coating, the method including depositing a powder coating on the first coating from a product flow wherein the product flow results from a chemical reaction in the flow and wherein the powder coating consolidates under appropriate conditions into an optical coating. Thereby, the optical coating and the first coating, following consolidation, have a difference in index-of-refraction of at least about 1%. A wide range of compositions is used to form these coatings, for example silicate glass with different dopants (e.g. phosphate, germanium or boron dopants) to be able to influence the refractive index and other optical properties.

In order to arrive at a high and uniform doping, a doping gas must be used in the treatment of $SiO_2$ soot bodies that allows the containing fluorine to react with the $SiO_2$ matrix within an acceptable temperature window and diffuse into the soot bodies as quickly as possible.

For this purpose, $CF_4$, $SF_6$, $C_2F_6$ and $NF_3$ are known from the prior art as gaseous fluorinating agents. However, these gases have a considerable global warming potential (GWP) and remain in the atmosphere for a very long time due to their chemical stability. Due to tightening environmental laws and regulations, it is to be expected that the marketing of such substances will become increasingly difficult, and their commercial availability will decline, so that they will no longer be available for the purpose of manufacturing fluorinated quartz glasses, at least permanently.

Another disadvantage of the fluorinating agents known from the prior art is their low boiling point, which makes handling difficult. For instance, fluorinating agents with a low boiling point require relatively large volumes in the equipment used, the corresponding fluorinating agents have to be stored in pressurized gas cylinders in a relatively costly manner and, in addition, higher safety standards are generally required. For these and other reasons there is a need for the present invention.

SUMMARY

An object of one embodiment is therefore to provide a process for the production of fluorine-doped quartz glass in which alternative fluorinating agents are used which allow the production of fluorinated quartz glass with a low global warming potential.

Another object of one embodiment is to provide a process for the preparation of fluorinated quartz glass by using alternative fluorinating agents which can be efficiently used for the fluorination of quartz glass.

It is also an object of one embodiment to provide a process which permits the production of fluorinated quartz glass having a high fluorine content and a homogeneous distribution of the dopant.

Furthermore, it is an embodiment of one embodiment to provide a process for the production of fluorine-doped quartz glass, wherein the quartz glass has a high content of fluorine with simultaneously minimal blistering.

Finally, it is a further object of one embodiment to provide a process for the production of fluorinated quartz glass in which a fluorinating agent is used which can be handled easily, in which apparatuses with a relatively small volume can be used, relatively complex handling with pressurized gas cylinders can be avoided and, in addition, in which no particularly high safety standards have to be observed.

These tasks are solved by the use of new fluorinating agents. These new fluorinating agents are characterized by a higher boiling point compared to the prior art, which at least partially simplifies the handling of the fluorinating agents. The fluorinating agents according to the invention have a boiling point of greater than or equal to −10° C. and can thus be supplied to an evaporator in a simple manner.

DETAILED DESCRIPTION

In the following Detailed Description, reference is made to the accompanying drawings, which form a part hereof, and in which is illustrated by way of illustration specific inventions in which one inventions may be practiced. In this regard, directional terminology, such as "top," "bottom," "front," "back," "leading," "trailing," etc., is used with reference to the orientation of the Figure(s) being described. Because components of inventions can be positioned in a number of different orientations, the directional terminology is used for purposes of illustration and is in no way limiting. It is to be understood that other inventions may be utilized and structural or logical changes may be made without departing from the scope of the present inventions. The following detailed description, therefore, is not to be taken in a limiting sense, and the scope of the present inventions are defined by the appended claims.

It is to be understood that the features of the various exemplary inventions described herein may be combined with each other, unless specifically noted otherwise.

Accordingly, one embodiment relates to a process for producing a fluorinated quartz glass including at least the following process steps:

a. providing a $SiO_2$ soot body;
b. reacting the $SiO_2$ soot body with at least one fluorinating agent to obtain a fluorinated $SiO_2$ soot body;
c. vitrification of the fluorinated $SiO_2$ soot body.

The process according to the invention is then characterized in that the fluorinating agent has a boiling point greater than or equal to −10° C.

In context of one embodiment, boiling points present at normal pressure (1013 mbar) are assumed.

By using a fluorinating agent that has a boiling point greater than or equal to −10° C., the handling and procedure of fluorination can be simplified.

In context of one embodiment, a fluorinating agent is understood to be a chemical substance containing fluorine atoms and capable of fluorinating a $SiO_2$ soot body.

In one embodiment, the fluorinating agent has a boiling point greater than or equal to −5° C., in one embodiment greater than or equal to 0° C., in one embodiment greater than or equal to 5° C., in one embodiment greater than or equal to 10° C., in one embodiment greater than or equal to 15° C., in one embodiment greater than or equal to 20° C.

The upper boiling point of the fluorinating agent proposed according to one embodiment is not subject to any particular technical limitations in that the fluorinating agent can be reacted in gaseous form with the $SiO_2$ soot body under the usual process conditions for the production of synthetic quartz glass.

In context of one embodiment, fluorinating agents having a boiling point of less than or equal to 300° C., in one embodiment less than or equal to 275° C., in one embodiment less than or equal to 250° C., in one embodiment less than or equal to 225° C., in one embodiment less than or equal to 200° C., in one embodiment less than or equal to 175° C., in one embodiment less than or equal to 150° C., are preferred.

The simplified handling of these alternative fluorinating agents is a direct result of the boiling point ranges previously described.

Thus, the fluorinating agents provided according to one embodiment have a boiling point range of −10 to 300° C., in one embodiment −5 to 275° C., in one embodiment 0 to 250° C., in one embodiment 5 to 225° C., in one embodiment 10 to 200° C., in one embodiment 15 to 175° C., in one embodiment 20 to 150° C.

The fluorinating agents provided according one embodiment one or more fluorinating agents selected from the group consisting of i. oxygen-containing fluorinating agents; and
ii. nitrile-containing Fluorinating agents.

In context of one embodiment, it is also possible to use mixtures of the above-mentioned oxygen-containing and nitrile-containing fluorinating agents in the process according to one embodiment, wherein in the context of one embodiment mixtures are understood to mean mixtures of pure nitrile-containing fluorinating agents, mixtures of pure oxygen-containing fluorinating agents, and mixtures of oxygen-containing and nitrile-containing fluorinating agents.

Preferred oxygen-containing fluorinating agents are now described in more detail hereafter.

In a first embodiment, the oxygen-containing fluorinating agents used are perfluoroketones of the general formula (I)

$$R_{F1}\text{—CO—}R_{F2} \qquad (I),$$

wherein
$R_{F1}$ is selected from the group consisting of perfluorinated carbon groups having 1 to 7 carbon atoms and fluorine, and $R_{F2}$ is selected from the group consisting of perfluorinated carbon groups having 1 to 7 carbon atoms.

In a preferred embodiment of this first embodiment, the perfluorinated carbon group includes 1 to 6, in one embodiment 2 to 6, in one embodiment 2 to 5, in one embodiment 2 to 4 carbon atoms.

Concrete examples of compounds of this first embodiment are
  a) perfluoro(2-methyl-3-pentanone); or 1,1,1,2,2,4,5,5-5-nonafluoro-4-(trifluoromethyl)-3-pentanone;
  b) perfluoro(2-methyl-3-butanone), or 1,1,1,3,4,4,4-heptafluoro-3-(trifluoromethyl)-2-buntanone; and
  c) perfluoro(2,2,-dimetyl-3-butanone).

The compounds
  a) perfluoro(2-methyl-3-pentanone); or 1,1,1,2,2,4,5,5-5-nonafluoro-4-(trifluoromethyl)-3-pentanone; and
  b) perfluoro(2-methyl-3-butanone), or 1,1,1,3,4,4,4-heptafluoro-3-(trifluoromethyl)-2-buntanone
are commercially available from the company 3M Deutschland GmbH under the tradenames NOVEC® 649 and NOVEC® 5110.

In a second embodiment, the oxygen-containing fluorinating agents used are perfluoroethers of the general formula (II)

$$R_{F1}\text{—C}(X_1)(X_2)\text{O—}R_{F2} \qquad (II),$$

wherein
$R_{F1}$ is selected from the group consisting of perfluorinated carbon groups having 1 to 7 carbon atoms and fluorine, and $R_{F2}$ is selected from the group consisting of perfluorinated carbon groups having 1 to 7 carbon atoms; and the residues $X_1$ and $X_2$ are F or $CF_3$.

In a preferred embodiment of this second embodiment, the perfluorinated carbon group consists of 1 to 6, in one embodiment 2 to 6, in one embodiment 2 to 5, in one embodiment 2 to 4 carbon atoms.

Specific examples of compounds of this second embodiment are
  a) perfluoro-1-methoxypropane;
  b) perfluoro-2-isopropoxy-2-methylpentane;
  c) perfluoro-1-ethoxyheptane; and
  d) perfluoro-2-n-butoxy-2-methylpentane.

In a third embodiment, the oxygen-containing fluorinating agents used are hydrofluoroethers of the general formula (III)

$$R_{F1}\text{—C}(X_1)(X_2)\text{O—}R_2 \qquad (III),$$

wherein
$R_{F1}$ is selected from the group consisting of perfluorinated carbon groups having 1 to 7 carbon atoms and fluorine;
$R_2$ is a non-fluorinated hydrocarbon group having from 1 to 3 carbon atoms; and
the residues $X_1$ and $X_2$ stand for F or $CF_3$.

In a preferred embodiment of this third embodiment, the perfluorinated carbon group includes from 1 to 6, in one embodiment from 2 to 6, in one embodiment from 2 to 5, in one embodiment from 2 to 4, carbon atoms.

Specific examples of compounds of this third embodiment are
  a) methylnonafluorbutyl ether;
  b) ethylnonafluorbutyl ether; and
  c) 2-trifluormethyl-3-ethoxydodekafluorhexane.

The aforementioned specific examples of the first to third inventions are commercially available.

In the following, preferred nitrile-containing fluorinating agents are now described in more detail as a fourth embodiment.

The nitrile-containing fluorinating agents are in one embodiment perfluoronitriles of the general formula (IV)

$$R_{F1}\text{—C} \equiv \text{N} \qquad (IV)$$

wherein
$R_{F1}$ is selected from the group consisting of a perfluorinated hydrocarbon group having 1 to 7 carbon atoms. In a preferred embodiment of this fourth embodiment, the perfluorinated carbon group consists of 1 to 6, in one embodiment 2 to 6, in one embodiment 2 to 5, in one embodiment 2 to 4, carbon atoms.

Specific examples of compounds of this fourth embodiment are
  a) heptafluoro-isobutyronitrile; or
  b) 2,3,3,3-tetrafluoro-2-(trifluoromethyl)propanenitrile.

These compounds are also commercially available.

As already illustrated by the above examples, perfluorinated carbon groups in the context of one embodiment are understood to be organic compounds in which the hydrogen atoms in the carbon network of at least one carbon atom have been completely replaced by fluorine atoms. In one embodiment, all hydrogen atoms in the carbon network have been replaced by fluorine atoms.

In context of one embodiment, the fluorinating agents described above are brought into contact with a $SiO_2$ soot body to react with the $SiO_2$ soot body, wherein at least a partially fluorination of the $SiO_2$ soot body occurs.

A soot body in context of one embodiment is a porous blank obtained by depositing $SiO_2$ particles on a carrier, which is transformed into the finished quartz glass by vitrification. In general, the structure of the $SiO_2$ soot body is sufficiently gas permeable, allowing uniform gas phase treatment or sintering. In the area of layers with a higher density, this is only possible to a limited extent, since these layers represent diffusion barriers which can cause an uneven treatment result during drying and sintering processes. Due to long diffusion paths, this problem arises in particular with large-volume $SiO_2$ soot bodies with high wall thicknesses.

A large number of processes are available to the person skilled in the art for the production of such soot bodies. Examples include the so-called CVD processes, in particular the OVD and VAD processes. In the OVD (Outside Vapor Deposition) process, $SiO_2$ particles are deposited on a cylindrical surface of an elongated carrier which rotates about its longitudinal axis. The carrier can be made of ceramic, graphite or quartz glass, for example. In the VAD (Vapor Axial Deposition) process, the $SiO_2$ particles are built up on a disk-shaped rotating carrier in the direction of the soot body longitudinal axis. In both processes, the $SiO_2$ particles can be deposited layer by layer on the carrier to form the soot body.

The corresponding $SiO_2$ soot bodies have a porous structure so that the fluorination agents can penetrate through the pores of the $SiO_2$ soot body into the three-dimensional structure of the body and cause homogeneous fluorination of the $SiO_2$ soot body.

In an embodiment of one embodiment, the used fluorinating agents are free of alkali elements, in particular free of sodium.

In a further embodiment of one embodiment, the fluorinating agent is not a sodiumfluoroalkoxide.

In the following, the individual process steps a. to c. are described in more detail.

Process Step a.

To prepare the $SiO_2$ soot body, a feedstock containing at least one polymerizable polyalkylsiloxane compound is first evaporated to form a feedstock vapor.

In principle, any polymerizable polyalkylsiloxane compound suitable for the production of synthetic quartz glass can be used according to one embodiment. In the context of one embodiment, the term polyalkylsiloxane encompasses both linear (including branched structures) and cyclic molecular structures.

Particularly suitable cyclic representatives are polyalkylsiloxanes with the general formula $$Si_pO_p(R)_{2p},$$

where p is an integer greater than or equal to 2. The residue "R" is an alkyl group, in the simplest case a methyl group.

Polyalkylsiloxanes are characterized by a particularly high proportion of silicon per weight percent, which contributes to the economic efficiency of their use in the production of synthetic quartz glass.

The polyalkylsiloxane compound is in one embodiment selected from the group consisting of hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexadecamethylcyclooctasiloxane (D8) and their linear homologues and any mixtures of the above compounds. The notation D3, D4, D6, D7 and D8 is taken from a notation introduced by General Electric Inc. in which "D" represents the group $[(CH_3)_2Si]$—O—. The notation is known to persons skilled in the art.

Within the scope of one embodiment, mixtures of the aforementioned polyalkylsiloxane compounds can also be used.

Because of its large-scale availability in high purity, octamethylcyclotetrasiloxane (OMCTS) is currently preferred. Within the scope of one embodiment, it is therefore particularly preferred if the polyalkylsiloxane compound is octamethylcyclotetrasiloxane (D4). The person skilled in the art is aware that alternative raw materials such as silicon tetrachloride or hexamethyldisiloxane (HMDS) or others can also be used.

In principle, it is possible to purify the feedstock before it is introduced into the process step. Such purification processes are known to the person skilled in the art.

Evaporation of the feedstock of the $SiO_2$ precursor of the intended soot body can occur with or without the presence of a carrier gas component. In one embodiment, the feedstock vaporization occurs in the presence of a carrier gas, as this allows the vaporization to occur at temperatures below the boiling point of the polyalkylsiloxane compound. This means that the feedstock vapor in one embodiment additionally includes a carrier gas. Such an approach is preferred if the evaporation of the feedstock is to take place below its boiling point. The inert gas is in one embodiment chemically inert and is further in one embodiment nitrogen or argon. Alternatively, oxygen can also be used as the carrier gas. The molar ratio of the polymerizable polyalkylsiloxane compound to the carrier gas is in one embodiment in the range from 0.01 to 2, particularly in one embodiment in the range from 0.02 to 1.5, very particularly in one embodiment in the range from 0.05 to 1.25. In one embodiment, it is preferred that nitrogen with a moisture content of less than 40 ppm by volume is used as the carrier gas and OMCTS is used as the polyalkylsiloxane compound. It is also preferred that the molecular ratio of OMCTS to nitrogen is in the range from 0.015 to 1.5.

The process step of evaporation is known to the person skilled in the art. Depending on the selected molecular ratio of the polyalkylsiloxane compound and the carrier gas, the polyalkylsiloxane compound is converted into a vapor phase, in one embodiment at temperatures between 120 and 200° C. The evaporation temperature in the evaporation chamber should always be at least a few degrees above the dew point of the polyalkylsiloxane compound. The dew point is in turn dependent on the selected molecular ratio of the polyalkylsiloxane compound and the carrier gas. In a preferred mode, the polyalkylsiloxane compound is preheated to temperatures between 40 and 120° C. before evaporation and then sprayed into an evaporation chamber that has a higher temperature than the preheating of the feedstock. In a preferred configuration, the inert carrier gas can additionally be preheated to temperatures of up to 250° C. before being supplied to the evaporation chamber. It is advantageous that the average temperature in the evaporation chamber is always above the dew point temperature of the mixture of polyalkylsiloxane and carrier gas. Suitable evaporation processes are described, for example, in the International patent applications WO 2013/087751 A and WO 2014/187513 A and the German patent application DE 10 2013 209 673 A.

In context of the invention, the term "dew point" describes the temperature at which a state of equilibrium is reached between condensing and evaporating liquid.

When using temperatures below the boiling point of the feedstock, evaporation in one embodiment takes place together with an inert carrier gas.

In context of one embodiment, "vaporization" is understood to be the process by which the feedstock is substantially converted from the liquid phase to a gaseous phase. This is in one embodiment done by using temperatures, as described above, which are above the dew point of the polymerizable polyalkylsiloxane compound as the main component of the feedstock. The person skilled in the art is aware that, from a process engineering point of view, it cannot be ruled out that small liquid droplets of the feedstock may be entrained. In one embodiment, therefore, a feedstock vapor is generated which in one embodiment includes not less than 97 mol %, in one embodiment not less than 98 mol %, particularly in one embodiment not less than 99 mol %, very particularly in one embodiment not less than 99.9 mol %, of gaseous constituents.

The generated feedstock vapor is supplied into a reaction zone where the feedstock vapor is converted to $SiO_2$ particles by oxidation and/or by hydrolysis. The resulting $SiO_2$ particles are deposited on a deposition surface to form the $SiO_2$ soot body. The possible embodiments are known to the person skilled in the art.

The soot body prepared in the process step a. of the process according to one embodiment preferably has an average density in a range of 18 to 30%, based on the relative density of quartz glass. This is based on a quartz glass density of 2.21 g/cm³. The density achieved depends, among other things, on the distance between the burners and the deposition surface, the used temperature, the stoichiometry of the gases and the geometry of the burners. Corresponding settings are known to the person skilled in the art.

The density of the soot body can be determined by known methods. For example, the local density of the soot body can be determined using computed tomographic methods by taking sectional images of the soot body. The average density is then determined by averaging over all measuring points.

Particularly preferred is an embodiment of the process according to one embodiment in which the soot body has a specific surface area according to BET of 7 to 16 m²/g, in one embodiment 10 to 15 m²/g, determined according to DIN-ISO 9277:2003-5.

The soot body resulting from the process step a. can be dried prior to reaction with the fluorinating agent in process step b. in order to remove any impurities, such as hydroxyl groups (OH groups), that may be present in the soot body. In this case, the drying can be carried out thermally and/or chemically. A particularly preferred embodiment is one in which the soot body is dried thermally and/or chemically in process step a. at a temperature in a range from 700 to 1100° C.

Thermal drying of the soot body is in one embodiment carried out in the presence of one or more inert gases. In this way, areas of the soot body that have already been cleaned are prevented from being recontaminated. In one embodiment, the inert gas is selected from the group consisting of He, Ar, $N_2$ and mixtures thereof.

Further in one embodiment, the chemical drying of the soot body is carried out in the presence of a chlorine-containing compound. Particularly preferred is the use of chlorine ($CI_2$).

Another process of chemical drying of the soot body is the use of carbon monoxide (CO).

Particularly preferred is an embodiment in which the soot body is dried in process step a. first in the presence of an inert gas and then in the presence of a chlorine-containing compound, wherein the temperature in each case ranges from 700 to 1100° C.

Process Step b.

In process step b., the soot body is then subjected to fluorination with the fluorinating agents according to one embodiment. The doping of the soot body is carried out in process step b. of the process according to one embodiment by treating the soot body with a gas including at least one of the fluorinating agents described above. The fluorinating agent may also be a mixture of several fluorinating agents according to one embodiment.

Furthermore, it is possible that the fluorinating agents according to one embodiment are used in combination with fluorinating agents already known from the prior art, such as $CF_4$, $SF_6$, $C_2F_6$ and $NF_3$.

The fluorinating agent can be used, for example, with a carrier gas, whereby a homogeneous distribution of the fluorinating agent in the soot body can in one embodiment be achieved. For this purpose, the gas used in one embodiment includes 5 to 100 mol %, in one embodiment 7.5 to 100 mol %, in one embodiment 9 to 100 mol %, in one embodiment 30 to 100 mol %, in each case based on the total amount of gas of fluorinating agent according to one embodiment. Therefore, a preferred configuration of the method is one in which the amount of fluorinating agent in the gas is 5 to 100 mol %, in one embodiment 7.5 to 100 mol %, in one embodiment 9 to 100 mol %, in one embodiment 30 to 100 mol %, in each case based on the total amount of the gas. The amount of fluorinating agent in the gas may vary depending on the type of fluorinating agent.

It has proved particularly advantageous if the treatment of the soot body in process step b. of the process according to one embodiment is performed at elevated temperature. By doing this, a homogeneous distribution of the dopant and a low level of undesirable impurities can be achieved. Therefore, a preferred configuration is one in which the treatment of the soot body in process step b. is carried out at a temperature in a range of 700 to 1250° C. Other suitable temperatures for the reaction of the $SiO_2$ soot body with the fluorinating agent are in a temperature range of 700 to 1200° C., 800 to 1200° C., 900 to 1200° C., 700 to 1150° C., 800 to 1150° C., 900 to 1150° C., 700 to 1100° C., 800 to 1100° C. and 900 to 1100° C.

The temperature or temperature range in which the treatment is carried out should be selected in consideration of the fluorine-containing compound used.

The duration of the fluorination of the $SiO_2$ soot body can vary depending on the fluorination content to be achieved and can require up to 36 hours, in one embodiment zp to 24 hours.

After treatment of the soot body with the fluorinating agent, in one embodiment of the process according to the invention, the soot body thus obtained is heated to a temperature in a range from 950 to 1150° C. to form a fluorinated soot body. During this process, the fluorinated soot body is compacted so that the average density of the resulting fluorinated soot body is at most 80%, in one embodiment at most 60%, of the relative density of quartz glass. In a particularly preferred embodiment, the average density of the soot body thus obtained is 40 to 80%, in one embodiment 50 to 60%, of the relative density of quartz glass. The temperature to which the fluorinated soot body is heated depends on the intended degree of compaction and the fluorine-containing compound used. In this way it is achieved that the introduced fluorine is fixed in the $SiO_2$ matrix of the soot body, while at the same time not all pores are closed yet. This enables gas exchange so that, for example, any remaining impurities or possible gas inclusions can be removed. It has proven to be particularly advantageous if the fluorinated soot body of the process according to the invention is heated to a temperature that is at least 100° C. lower than the subsequent vitrification temperature. Therefore, an embodiment is preferred in which the temperature is at least 100° C., in one embodiment 150° C., below the vitrification temperature of the fluorinated soot body.

Furthermore, it has proven advantageous to dry the fluorinated soot body in a chlorine-containing atmosphere. This results in a substitution of the OH groups in the intermediate by chlorine, which leads to a reduction in attenuation in the later fiber. Therefore, an embodiment in which the fluorinated soot body is dried in a chlorine-containing atmosphere is preferred, wherein the drying is in one embodiment carried out at a temperature in a range of 700 to 1100° C. Particularly in one embodiment, the chlorine-containing atmosphere includes a chlorine-containing compound, in one embodiment $CI_2$. Furthermore, preferred is an embodiment wherein the proportion of the chlorine-containing compound is 5 to 100% by volume, based on the total volume of the gas.

In context of one embodiment, it is possible to perform the fluorination of the Sift soot body in an inert gas furnace, an atmospheric furnace, a crucible furnace, a flow-through furnace, an isothermal furnace, or a retort furnace.

Process Step c.

In process step c. of the process according to one embodiment, the fluorinated soot body is vitrified. In one embodiment, the vitrification temperature in process step c. ranges from 1100 to 1500° C., in one embodiment 1150 to 1350° C.

In order to avoid blister formation in the later quartz glass, it has proven advantageous if the vitrification is performed under vacuum or under a helium or helium/fluorinating agent mixed gas atmosphere. This also has the advantage that the material of the process chamber is not degraded by aggressive and corrosive gases and is therefore subject to reduced deterioration.

In order to protect the materials, in one embodiment of the process chamber, it has proven advantageous if the doping of the soot body and the vitrification of the fluorinated soot body are carried out in different process chambers. Therefore, according to the process of the invention, the vitrification in process step c. occurs in a second process chamber that is different from the first process chamber. By doing this, each of the process chambers can be optimized for the corresponding process steps and excessive stress on the materials, for example due to aggressive and corrosive gases at high temperatures, is avoided. Therefore, an embodiment is preferred wherein the vitrification in process step c. is performed in a second process chamber that is different from the first process chamber in which process steps a. and b. are performed. For example, the second process chamber may be a zone furnace in which the vitrification of the fluorinated soot body is carried out zone by zone. In one embodiment, the second process chamber is not exposed to fluorine-containing gases.

The process step c. of vitrification of the fluorinated $SiO_2$ soot body can be performed in the usual furnaces known to the person skilled in the art. Examples are furnaces with a constant temperature, gas pressure sintering furnaces, vacuum furnaces, flow-through furnaces, furnaces at normal or low pressure.

In one embodiment, the second process chamber is a vitrification furnace. Such furnaces are known to the person skilled in the art and can be used in the process according to the specific requirements for size and shape of the soot body.

In a further embodiment, process steps b. and c. are carried out in an isothermal furnace with a quartz glass process tube. Suitable furnaces are known to the person skilled in the art from the prior art.

During transport of the fluorinated soot body from the first process chamber to the second process chamber, the water content of the atmosphere can lead to diffusion of water and, as a result, to contamination with OH groups and, consequently, to an axially and radially inhomogeneous distribution of the OH group concentration in the subsequent quartz glass. Furthermore, the presence of OH groups in the fluorinated soot body has the disadvantage that these OH groups exhibit high absorption in the range of the usual working wavelengths of optical fibers and therefore negatively influence the quality of the later product. In order to reduce the OH concentration in the fluorinated soot body, it has therefore proved advantageous to subject the fluorinated soot body to a drying step before vitrification.

Therefore, an embodiment is preferred wherein the fluorinated soot body is subjected to a further drying step in the second process chamber prior to vitrification, wherein the drying is performed at a temperature in a range of 700 to 1200° C. It has been illustrated that decontamination can be eliminated in this way. Heating the fluorinated soot body to a temperature above 700° C. releases OH groups which, as a result of the porosity of the intermediate, migrate from the heating front away and leave the intermediate. To prevent already purified areas of the intermediate from reacting again with released water, they can be removed by purging with inert gas or by suction. It has proven advantageous to perform vitrification of the fluorinated soot body under reduced pressure. In this manner, simultaneous dehydration of the soot body takes place during the sintering process and any inclusions are avoided. In addition, blister formation in the later quartz glass is minimized. However, this process has the disadvantage that dopants physically bound in the soot body, in one embodiment gaseous fluorine compounds, can partially desorb during the vitrification process, especially in the outer layers. The consequence is the formation of an undesirable concentration gradient and a depletion of fluorine. These steps can be performed in the second process chamber, thus avoiding a costly reconstruction. To prevent renewed contamination, it has proven advantageous if the pressure during the drying step inside the second process chamber is lower than outside the second process chamber. An embodiment in which the pressure during the drying step in the second process chamber is less than 1 mbar is therefore particularly preferred.

In a particularly preferred embodiment, the process according to the invention includes the following process steps:

Process step A.1: providing a soot body, wherein the soot body has an average density in a range of 18 to 30% based on the relative density of quart glass;

Process step A.2: drying of the soot body at a temperature in a range of 700 to 1100° C.;

Process step A.3: if necessary, chemical drying of the soot body at a temperature in a range of 700 to 1100° C. in the presence of a chlorine-containing gas;

Process step B.1: treating the soot body with a fluorinating agent in a first process chamber to form a fluorinated soot body, wherein the average density of the fluorinated soot body increases by a maximum of 30%, relative to the average density of the soot body in step A.3;

Process step B. 2: if necessary, chemically drying the fluorinated soot body at a temperature in a range of 700 to 1100° C. in the presence of a chlorine-containing gas;

Process step C.1: vitrification of the fluorinated soot body at a temperature above 1000° C. in the process chamber, wherein the pressure inside the process chamber is less than or equal to the pressure outside the process chamber, forming the doped quartz glass.

Another object of one embodiment is to provide a doped quartz glass obtainable according to the process of the invention. Such a quartz glass is characterized by a homogeneous doping with fluorine, even at high fluorine contents and minor blistering.

The properties of the quartz glass, such as refractive index and absorption maxima, can be influenced by the presence of selected further foreign atoms in the quartz glass. Therefore, an embodiment in which the quartz glass has other dopants in addition to fluorine is preferred, wherein the dopant is in one embodiment selected from the group consisting of $Al_2O_3$, $Yb_2O_3$, $Er_2O_3$, $NbO_2$, $TiO_2$, $Ce_2O_3$, $Y_2O_3$, and mixtures thereof.

As is known to the person skilled in the art, the refractive index of quartz glass can be adjusted by selective doping with fluorine. However, the person skilled in the art is often confronted with the problem that the amount of fluorine present in the quartz glass is limited by the manufacturing process, since, for example, the fluorine is removed from the soot body again by corresponding process steps such as drying and vitrification in a vacuum. The quartz glass according to the invention, on the other hand, is characterized by a high fluorine content and a homogeneous distribution thereof in the quartz glass. Thus, in a preferred embodiment, the fluorine content in the quartz glass is 1,000 to 25,000 ppm, in one embodiment 2,000 to 20,000 ppm, in each case based on parts by weight.

Quartz glass, in one embodiment doped quartz glass, is widely used in optics and analytics. Therefore, a further object of one embodiment is to use the doped quartz glass according to the invention as an optical component, optical fiber form or as part of an optical fiber.

A further object of one embodiment is the use of the fluorinating agents described above for the production of fluorinated quartz glass. With respect to particular embodiments of these uses, reference is made to the above discussion of the process according to the invention.

The present invention is described in more detail by reference to the following examples:

EXAMPLES

In the present examples, the following two different fluorinating agents are used:
(1) Novec® 649 (perfluoro (2-methyl-3-pentanone) ((1,1,1,2,2,4,5,5,5-nonafluoro-4-(trifluoromethyl)-3-pentanone)) with the molecular formula $C_6F_{12}O$. The compound is a liquid at room temperature having a boiling point of 49° C.
(2) Novec® 5110 (perfluoro (2-methyl-3-butanone) ((1,1,1,3,4,4,4-heptafluoro-3-(trifluoromethyl)-2-butanone) with the molecular formula $C_5F_{10}O$. The compound is a liquid at room temperature having a boiling point of 26.9° C.

Both compounds are commercially available from 3M Deutschland GmbH, Neuss (Germany).

The fluorinating agents are provided as gaseous reactants as follows:

In the case of Novec® 649 (bp. 49° C.), A temperature-controlled (double-walled, temperature-controlled with water) evaporator or precursor storage vessel in a temperature-controlled chamber is used in combination with a vertical tube furnace with sample and gas cuvette. The piping system with a waste gas line and a reactive gas line allowed the precursor to be introduced with or without additional gases into the reaction zone in which the fluorination is carried out.

In the case of Novec® 5110 (bp. 26.9° C.), an evaporator vessel at a lower temperature was used.

The precursor flows were adjusted via temperature and by using a carrier gas flow.

The OVD bodies to be treated were placed in a silica glass reactor in a tube furnace and thermally dried with 50 sccm $N_2$ by first heating to 200° C. at 5 K/min (holding time: 2 h) and then heating to 900° C. at 5 K/min (holding time: max. 15 h).

Only in one experiment (experiment 5) a chemical drying by pre-chlorination (25 sccm $Cl_2$/25 sccm $N_2$, 3 h, 1000° C.) was carried out.

Subsequently, processing was carried out with one of the two alternative fluorinating agents mentioned above at the temperatures and process times illustrated in table 1 below for Novec® 649 and in table 2 below for Novec® 5110.

As a precursor current, 6.5 sccm was usually ensured by adjusting the carrier gas current $N_2$ as a function of the evaporator temperature was used; the additional current $N_2$ was adjusted accordingly so that the same total current was achieved in all experiments.

The temperature of the evaporator was 25° C. for Novec® 649 4.3° C. for Novec® 5110.

The final sintering of the treated samples was carried out in an additional corundum protection tube in the sintering furnace at 1550° C. under vacuum.

The content of fluorine in the final quartz materials are illustrated in tables 1 and 2 below.

The fluorine content of the final quartz materials are measured as follows:

A 1 mm thick slice was cut off the top and bottom of each vitrified sample and the radial fluorine concentration profiles were determined by electron beam microanalysis (ESMA).

TABLE 1

| Experiment | 1 | 2 | 3 | 4 | 5 | 6 | 7 | 8 |
|---|---|---|---|---|---|---|---|---|
| Precursor | Novec® 649 | | | | | | | |
| Temperature (° C.) | 900 | 900 | 1000 | 1100 | 1000 | 1000 | 1100 | 1100 |
| Duration (h) | 3 | 3 | 3 | 3 | 3 | 6 | 1.5 | 6 |
| $V_{N2}$ (Evaporator) (sccm) | 50 | 10 | 10 | 10 | 10 | 10 | 10 | 10 |
| $V_{precursor}$ (Sccm) | 32.5 | 6.5 | 6.5 | 6.5 | 6.5 | 6.5 | 6.5 | 6.5 |
| $V_{N2}$ (supplement) | 0 | 40 | 40 | 40 | 40 | 40 | 40 | 40 |
| $V_{total}$ | 83 | 57 | 57 | 57 | 57 | 57 | 57 | 57 |
| F content (ma %) | 0.34 | 0.29 | 0.39 | 0.53 | 0.21 | 0.52 | 0.41 | 0.49 |

TABLE 2

| | Experiment | |
|---|---|---|
| | 9 | 10 |
| Precursor | Novec ® 5110 | |
| Temperature (° C.) | 1000 | 1100 |
| Duration (h) | 3 | 6 |
| $V_{N2}$ (Evaporator) (sccm) | 10 | 10 |
| $V_{precursor}$ (sccm) | 6.5 | 6.5 |
| $V_{N2}$ (supplement) | 40 | 40 |
| $V_{total}$ | 57 | 57 |
| F content (ma %) | 0.34 | 0.46 |

The examples presented above illustrate that the process according to one embodiment is an efficient method for fluorinating silica soot materials, whereby the used fluorinating materials have a considerable reduced global warming potential (GWP) and do not remain in the atmosphere for a very long time.

Moreover, the fluorinating agents according to the present have in general higher boiling points as compared with the known fluorinating agents of the state of the art, which makes them easier in handling.

Although specific inventions have been illustrated and described herein, it will be appreciated by those of ordinary skill in the art that a variety of alternate and/or equivalent implementations may be substituted for the specific inventions illustrated and described without departing from the scope of the present inventions. This application is intended to cover any adaptations or variations of the specific inventions discussed herein. Therefore, it is intended that these inventions be limited only by the claims and the equivalents thereof.

The invention claimed is:
1. A process for producing a fluorinated quartz glass, comprising:
   (a) providing a $SiO_2$ soot body;

(b) reacting of the SiO$_2$ soot body with a fluorinating agent having a boiling point greater than or equal to −10° C. to obtain a fluorinated SiO$_2$ soot body;
(c) vitrifying the fluorinated SiO$_2$ soot body wherein the fluorination provided in (b) is carried out with a fluorinating agent selected from a group consisting of:
i. oxygen-containing fluorinating agents;
ii. nitrile-containing fluorinating agents;
iii. mixtures of oxygen-containing and nitrile-containing fluorinating agents; and characterized in that the oxygen-containing fluorinating agents are selected from a group consisting of:
i. Perfluoroketones of the general formula (I)

$$R_{F1}-CO-R_{F2} \quad (I),$$

wherein $R_{F1}$ is selected from a group consisting of perfluorinated carbon groups having 1 to 7 carbon atoms and fluorine; and $R_{F2}$ is selected from a group consisting of perfluorinated carbon groups having 1 to 7 carbon atoms;

ii. Perfluoroethers of general formula (II)

$$R_{F1}-C(X_1)(X_2)O-R_{F2} \quad (II),$$

wherein $R_{F1}$ is selected from the group consisting of perfluorinated carbon groups having 1 to 7 carbon atoms and fluorine; $R_{F2}$ is selected from the group consisting of perfluorinated carbon groups having 1 to 7 carbon atoms; and $X_1$ and $X_2$ are fluorine or $CF_3$;

iii. Hydrofluoroethers of the general formula (III)

$$R_{F1}-C(X_1)(X_2)O-R_2 \quad (III),$$

wherein $R_{F1}$ is selected from the group consisting of perfluorinated carbon groups having 1 to 7 carbon atoms and fluorine, $R_2$ is a non-fluorinated hydrocarbon group having 1 to 3 carbon atoms; and $X_1$ and $X_2$ are fluorine or $CF_3$.

2. The process according to claim 1, characterized in that the nitrile-containing fluorinating agents are selected from the group consisting of:

iv. Perfluoronitriles of the general formula (IV)

$$R_{F1}-C\equiv N$$

wherein $R_{F1}$ is selected from the group consisting of a perfluorinated carbon group having 1 to 7 carbon atoms.

3. The process according to claim 1, characterized in that the process (b) of reacting the SiO$_2$ soot body with the fluorinating agent having a boiling point greater than or equal to −10° C. is carried out at a temperature in a range from 700 to 1250° C.

4. The process according to claim 1, characterized in that the process c. of vitrifying the fluorinated SiO$_2$ soot body is carried out at a temperature in a range from 1100 to 1500° C.

5. The process according to claim 1, characterized in that the fluorinated SiO$_2$ soot body from process (b) is subjected to one or more further drying steps before vitrification in process step (c), whereby the drying is being carried out at a temperature in a range from 700 to 1200° C.

* * * * *